US007000431B2

(12) United States Patent
Dick et al.

(10) Patent No.: US 7,000,431 B2
(45) Date of Patent: Feb. 21, 2006

(54) METHOD OF PREVENTING SCHILEREN FORMATION IN A GLASS MELT WITH SAME

(75) Inventors: Erhard Dick, Pechbrunn (DE); Erich Fischer, Mitterteich (DE); Roland Fuchs, Mitterteich (DE); Markus Riedl, Mitterteich (DE)

(73) Assignee: Schott AG, Mainz (DE)

( * ) Notice: Subject to any disclaimer, the term of this patent is extended or adjusted under 35 U.S.C. 154(b) by 333 days.

(21) Appl. No.: 10/146,284

(22) Filed: May 15, 2002

(65) Prior Publication Data

US 2002/0178753 A1 Dec. 5, 2002

(30) Foreign Application Priority Data

Jun. 2, 2001 (DE) ................................ 101 27 142

(51) Int. Cl.
*C03B 15/14* (2006.01)

(52) U.S. Cl. ......................... 65/86; 65/135.2; 65/135.3

(58) Field of Classification Search .................... 65/86, 65/135.3, 180, 187, 135.2, 66
See application file for complete search history.

(56) References Cited

U.S. PATENT DOCUMENTS 2,093,374 A 9/1937 Wadsworth

FOREIGN PATENT DOCUMENTS

DE 568 955 1/1933

*Primary Examiner*—Dionne A. Walls
(74) *Attorney, Agent, or Firm*—Michael J. Striker

(57) ABSTRACT

The sleeve-type glass melt agitator has a rotatable cylindrical sleeve provided with outwardly protruding vane elements and through-going openings in its outer cylindrical surface to stir the glass melt when the sleeve is rotated. The sleeve type agitator is arranged vertically in a glass melt feed channel in a glass melt feed system for making glass tubes or pipes according to the Vello or down-drawn process. During formation of glass tubes or pipes from the glass melt the sleeve-type agitator is rotated as the glass melt flows downward to prevent formation of schlieren in the glass melt, which causes glass material losses.

2 Claims, 1 Drawing Sheet

FIG. 1
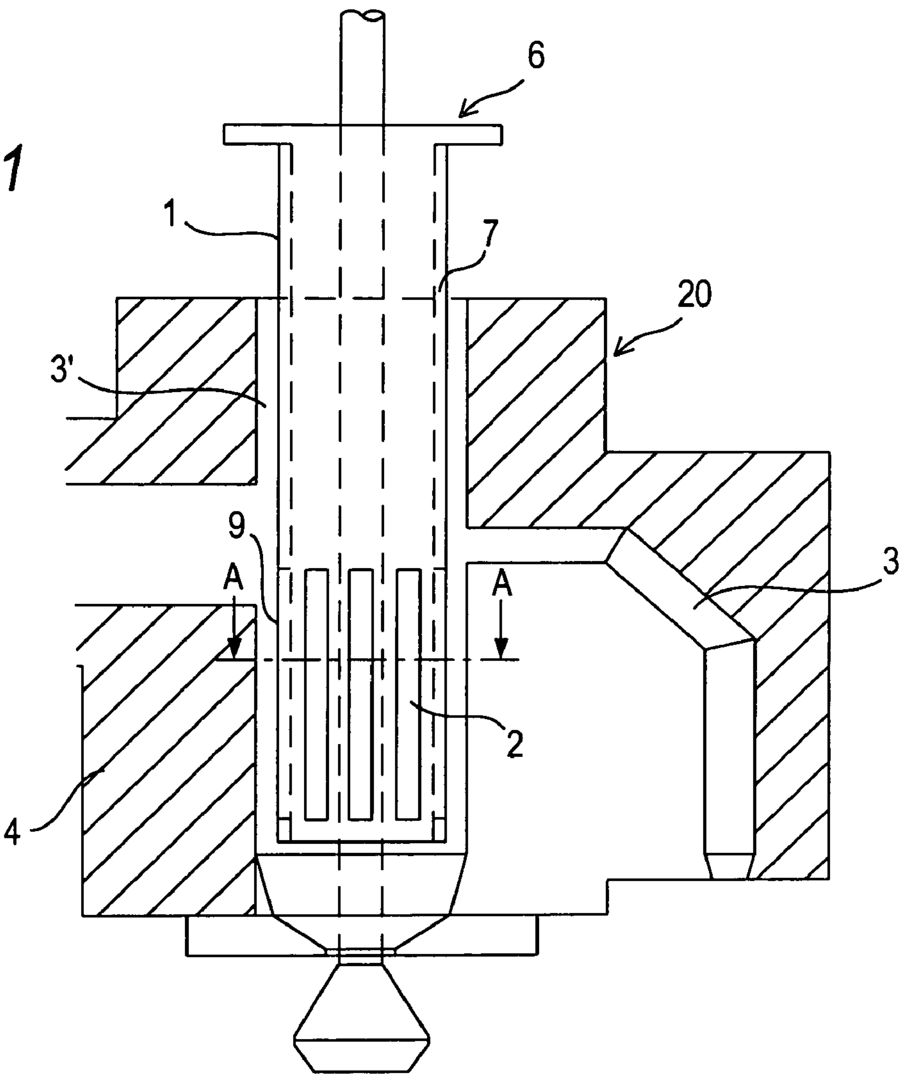
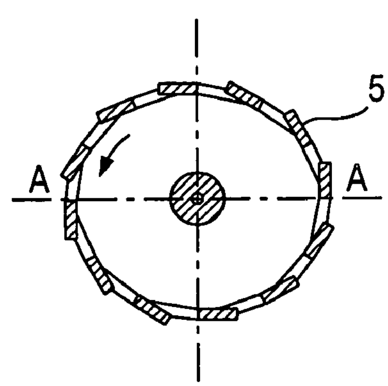
FIG. 2

METHOD OF PREVENTING SCHILEREN FORMATION IN A GLASS MELT WITH SAME

BACKGROUND OF THE INVENTION

1. Field of the Invention

The present invention relates to the Vello process and draw-down process for making glass products from a glass melt and, more particularly, to a sleeve-type agitator for the glass melt for preventing schlieren formation and for homogenizing the glass melt in the Vello process and draw-down process. The invention also relates to a method and apparatus for feeding a glass melt in order to make glass products, especially glass tubes or pipes, from the glass melt without schlieren formation in the glass melt.

2. Description of the Related Art

The Vello tube drawing process is a vertical drawing process for glass tube or pipe, in which the tube or pipe is drawn down from a circular nozzle. The glass melt flows through a nozzle with a cylindrical opening which is located at the bottom of a feed channel and over a funnel-shaped conical body which is adjustable in its height and which widens downward. The conical body is hollow and connected with a longitudinally extended pipe to a blower for air. The glass mass located around this valve body is held open when air is supplied through this pipe. The freely suspended glass is then drawn downward as a glass tube into a temperature regulated compartment or guided with the help of guide members into a horizontal orientation and drawn from the drawing machine.

The draw-down process operates exactly the same way that the Vello process does, except that the glass tube is not guided into a horizontal orientation, but instead is removed vertically from the drawing machine.

In the Vello head and draw-down head used in these glass product manufacturing processes schlieren are produced on the side facing away from the channel, which currently can be reduced only by connecting a head overflow. It is necessary to draw off the schlieren extending around the product with a head overflow duct in conventional feed heads. Faulty products would otherwise be produced with the schlieren extending around the product. Drawing the product with the schlieren thus causes glass losses.

SUMMARY OF THE INVENTION

It is an object of the present invention to provide a device for prevention of schlieren formation in the Vello and draw-down processes for making glass products, especially glass tubes or pipes.

It is another object of the present invention to provide a method for eliminating schlieren in a glass melt fed through a glass melt feed system or head hand thus from glass products made from the glass melt by the Vello and draw-down processes.

It is an additional object of the present invention to provide an improved method and apparatus for feeding a glass melt in order to make glass products, especially glass tubes or pipes, from the glass melt without the formation of schlieren in the glass melt.

According to the invention the device for prevention of schlieren formation in the Vello process or draw-down process comprises a sleeve-type agitator for the glass melt arranged in the glass melt feed system or feed head. This sleeve-type agitator comprises a sleeve, which is a cylindrical member. The sleeve has a jacket or wall with an outer surface, which is provided with vane elements and openings, especially through-going passages or holes, formed to stir the glass melt when the agitator, i.e. the sleeve, is rotated in the melt. The sleeve-type agitator is arranged in the glass melt feed system or feed head for the glass melt in the Vello or draw-down process and is operated to eliminate schlieren from the glass melt as it is fed through the feed system or feed head.

When the apparatus of the invention, namely the sleeve-type agitator or sleeve, is rotated, the schlieren in the wall of the tube disappears and is thus no longer visible. The drawing off of faulty glass having the schlieren through the head overflow duct is no longer necessary. No glass losses arise for this reason, since no schlieren-containing products are drawn off. The yield of good glass products increases because of the use of the sleeve-type agitator according to the invention.

According to an advantageous aspect of the invention the openings in the jacket or wall are provided by the vane elements. Good results are obtained with these openings. The small vane elements are especially suitable.

According to a preferred aspect of the invention the sleeve-type agitator is made from a high-temperature resistant material, such as noble metal, high-temperature steel or ceramic material. Agitators made from these materials are especially suitable for processing the glass melt and for the method according to the invention.

According to the invention the method for prevention of schlieren formation in the glass melt during the Vello process or draw-down process for making glass products comprises arranging the sleeve-type agitator according to the invention vertically in a glass melt feed system or feed head for the glass melt, conducting the glass melt downward through the glass melt feed system or feed head and operating the sleeve-type agitator during the conducting to eliminate schlieren from the glass melt. During the operating of the sleeve-type agitator it is rotated in the glass melt so as to eliminate the schlieren in the glass melt.

In a preferred embodiment of the method according to the invention the rotation speed of the sleeve-type agitator is greater than one revolution per minute. By rotation of the agitator the schlieren in the wall of the glass tube being drawn disappears and thus is not visible. The drawing off of faulty glass containing the schlieren is thus not necessary when the agitator and method according to the invention are used.

The invention also includes the improved glass melt feed system for making glass products according to the Vello or draw-down process, including the glass melt feed head with the above-described sleeve-type agitator for the glass melt arranged vertically in the glass melt feed head.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 1 is a longitudinal cross-sectional view through one embodiment of a sleeve-type agitator according to the invention for the glass melt in the Vello process or the draw-down process for making glass products; and FIG. 2 is a transverse cross-sectional view through the sleeve-type agitator shown in FIG. 1 taken along the section line A—A in FIG. 1.

DETAILED DESCRIPTION OF THE INVENTION

FIG. 1 shows a sleeve-type agitator 1 for eliminating schlieren from a glass melt flowing through a glass melt feed head 4 in an apparatus for making glass products, especially tubes or pipes. The sleeve-type agitator 1 comprises a sleeve 6, which is a cylindrical or tube-shaped member. The sleeve 6 has a jacket or wall 7 with an outer surface 9. The wall 7 has circumferentially distributed openings 2, which are advantageously through-going passages, and small circumferentially distributed, outwardly protruding vane elements 5, provided in its outer surface 9, which guarantee an exchange of glass material from the glass melt between respective volumes or spaces both inside and outside of the sleeve 6.

The sleeve-type agitator 1 is arranged in the glass melt feed system 20 for the apparatus for making the glass tubes or pipes according to the Vello process or draw-down process. This glass melt feed system 20 includes the glass melt feed head 4, which is provided with a glass melt feed channel 3' and a head overflow duct 3 for faulty glass material containing schlieren. The sleeve-type agitator 1 is arranged vertically in the glass melt feed channel 3'.

The schlieren appearing in the wall of the glass tube drawn from the glass melt feed head 4 disappears when the sleeve-type agitator 1, i.e. the sleeve 7, is rotated in the feed head 4. The drawing off of faulty glass material through the head overflow duct 3 is thus not necessary to eliminate fault-containing products.

FIG. 2 shows a transverse cross-section through the sleeve 6 of the sleeve-type stirrer 1 with the small circumferentially distributed, outwardly protruding vane elements 5 in the outer surface 9 of the wall of the sleeve 6.

The disclosure in German Patent Application 101 27 142.5 of Jun. 2, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a sleeve-type agitator for the glass melt and method for prevention of schlieren in glass products made by the Vello or draw-down methods, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of preventing schlieren formation in a glass melt flowing through a glass melt feed system (20) for making products according to the Vello process or the down-draw process, said method comprising the steps of:

a) providing a sleeve-type agitator (1) comprising a cylindrical sleeve (6), said cylindrical sleeve having a cylinder wall (7) provided with a pluralty of circumferentially distributed, outwardly protruding vane elements (5) and openings (2) in an outer surface of said cylinder wall, said openings (2) and said vane elements (5) being formed to at least partly stir said glass melt when said sleeve is rotated;

b) arranging said sleeve-type agitator (1) vertically in a glass melt feed channel (3') of said glass melt feed system (20); and c) rotating said sleeve (6) provided with vane elements (5) and said openings (2) to at least partly stir said glass melt when said glass melt flows downward through said glass melt feed channel (3') of said glass melt feed system (4) and to guarantee exchange of glass material of the glass melt between respective volumes or spaces both inside and outside of the sleeve;

whereby schlieren formation in said glass melt and glass material losses are prevented.

2. The method as defined in claim 1, wherein said sleeve (6) is rotated at a rotation speed greater than one revolution per minute during the rotating to at least partly stir the glass melt.

* * * * *